US007974982B2

(12) United States Patent
Christianson

(10) Patent No.: US 7,974,982 B2
(45) Date of Patent: Jul. 5, 2011

(54) SYSTEM AND METHOD FOR DEVICE PROFILING USING CASCADED DATABASES

(75) Inventor: Ryan Christianson, Lynnwood, WA (US)

(73) Assignee: Disney Enterprises, Inc., Burbank, CA (US)

( * ) Notice: Subject to any disclaimer, the term of this patent is extended or adjusted under 35 U.S.C. 154(b) by 498 days.

(21) Appl. No.: 12/115,039

(22) Filed: May 5, 2008

(65) Prior Publication Data

US 2009/0198653 A1 Aug. 6, 2009

Related U.S. Application Data

(60) Provisional application No. 61/026,110, filed on Feb. 4, 2008.

(51) Int. Cl.
*G06F 17/30* (2006.01)
(52) U.S. Cl. ........ 707/769; 707/705; 707/758; 707/775; 707/781
(58) Field of Classification Search .................. 707/782, 707/705, 758, 769, 775, 781
See application file for complete search history.

(56) References Cited

U.S. PATENT DOCUMENTS

| | | | |
|---|---|---|---|
| 5,659,732 A | 8/1997 | Kirsch | |
| 6,023,739 A * | 2/2000 | Arm et al. ........................ | 710/40 |
| 6,324,534 B1 * | 11/2001 | Neal et al. ........................ | 1/1 |
| 6,339,773 B1 | 1/2002 | Rishe | |
| 6,842,510 B2 * | 1/2005 | Sakamoto ................ | 379/102.01 |
| 6,886,017 B1 * | 4/2005 | Jackson et al. ........................ | 1/1 |
| 6,907,424 B1 | 6/2005 | Neal et al. | |
| 7,058,757 B1 | 6/2006 | Branth et al. | |
| 7,085,763 B2 * | 8/2006 | Ochiai et al. ........................ | 1/1 |
| 7,191,173 B2 * | 3/2007 | Mizunuma et al. ........................ | 1/1 |
| 2001/0021929 A1 * | 9/2001 | Lin et al. ........................ | 707/2 |
| 2001/0034771 A1 * | 10/2001 | Hutsch et al. ........................ | 709/217 |
| 2003/0043765 A1 * | 3/2003 | Dawidowsky et al. ........ | 370/331 |
| 2004/0153512 A1 * | 8/2004 | Friend ........................ | 709/206 |
| 2004/0193590 A1 * | 9/2004 | Mizunuma et al. ........................ | 707/3 |
| 2004/0203755 A1 * | 10/2004 | Brunet et al. ........................ | 455/432.1 |
| 2004/0236903 A1 * | 11/2004 | Wakimoto et al. ........................ | 711/108 |
| 2006/0023642 A1 * | 2/2006 | Roskowski et al. ........................ | 370/254 |
| 2006/0271934 A1 * | 11/2006 | Ezaki ........................ | 718/100 |
| 2007/0016676 A1 * | 1/2007 | Breuer et al. ........................ | 709/225 |
| 2008/0298325 A1 * | 12/2008 | Vujcic ........................ | 370/336 |
| 2009/0019363 A1 * | 1/2009 | Andreev et al. ........................ | 715/257 |
| 2009/0044126 A1 * | 2/2009 | Wyler et al. ........................ | 715/734 |
| 2010/0131484 A1 * | 5/2010 | Gosse et al. ........................ | 707/706 |
| 2010/0257137 A1 * | 10/2010 | Escribano Bullon et al. | 707/623 |

OTHER PUBLICATIONS

Nielsen, SQL Server 2005 Bible, Nov. 6, 2006, pp. 677-687, ISBN 978-0-764542-15-7.*

* cited by examiner

*Primary Examiner* — Frantz Coby
(74) *Attorney, Agent, or Firm* — Smith Risley Tempel Santos LLC; Michael J. Tempel

(57) ABSTRACT

A system for device profiling using cascaded databases includes a client configured to deliver data to a device, and a plurality of databases accessible by the client, each of the plurality databases containing information relevant to the device, such that the plurality of databases are queried in a prioritized order to obtain information relevant to the device.

27 Claims, 5 Drawing Sheets

SYSTEM AND METHOD FOR DEVICE PROFILING USING CASCADED DATABASES

CROSS-REFERENCE TO RELATED APPLICATION

This application claims priority to and the benefit of the filing date of co-pending U.S. Provisional Patent Application No. 61/026,110, filed on Feb. 4, 2008, entitled "Mobile Device Profiling Using Cascading Databases," the entire disclosure of which is hereby incorporated herein by reference.

BACKGROUND

In many stationary and mobile applications in which a device requests information from a service, it is desirable to recognize the type of device that is being served and have the ability to obtain data about that specific device in order to respond appropriately to the request. For example, in a mobile application, such as serving a mobile web page to a user on a mobile device using a wireless application protocol (WAP), it is desirable to recognize the type of device that is being served and have the ability to obtain data about the specific mobile device in order to respond appropriately to the request. It is common to use a device profile data source to look up this information. The device profile data source includes information that is specific to the type of device that is requesting the data.

Unfortunately there are many device profile data sources, and none of them are comprehensive. Each device profile data source may include data specific to different parts of the device, each device profile data source may include data on different sets of devices, and different device profile data sources typically have varying levels of accuracy. One of the reasons that device profile data sources are somewhat inaccurate is because it is costly to collect this data. Therefore, most of the data sources include only data that the provider is focused on. For example, a company located in the United Kingdom (UK) that sells images might provide a device profile database that is focused on device image capabilities for devices common in Europe, but may have little or no data regarding audio capabilities for devices in the United States.

Also, some device profile data is gathered through a careful process of research and hands-on testing of devices, while other device profile data is gathered without such careful research and testing. The former data tends to be accurate, but more limited and expensive, while the latter tends to be free, but error-prone.

One of the challenges facing providers of data, such as, but not limited to, a World Wide Web (WWW) based application data server, concerns the efficient use of device data that may be provided from a variety of device profile data sources. Further, specifically tailoring the available device profile data for a specific device that may be querying the application server remains a challenge. For example, a variety of different devices may query the web server for data.

Providing the data efficiently and in a usable manner to a variety of different devices and device types requires that the web server consider multiple device profile data sources and the type of business hosting the web application, while taking into account the types of devices that the application is targeting, the types of device profile parameters in which the application is interested, the expense the application/business can afford to pay for device profile data, and other considerations.

Therefore, there is a need for a way of efficiently delivering application data to a variety of different devices.

SUMMARY

Embodiments of the invention include a system for device profiling using cascaded databases including a client configured to deliver data to a device, and a plurality of databases accessible by the client, each of the plurality databases containing information relevant to the device, such that the plurality of databases are queried in a prioritized order to obtain information relevant to the device.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
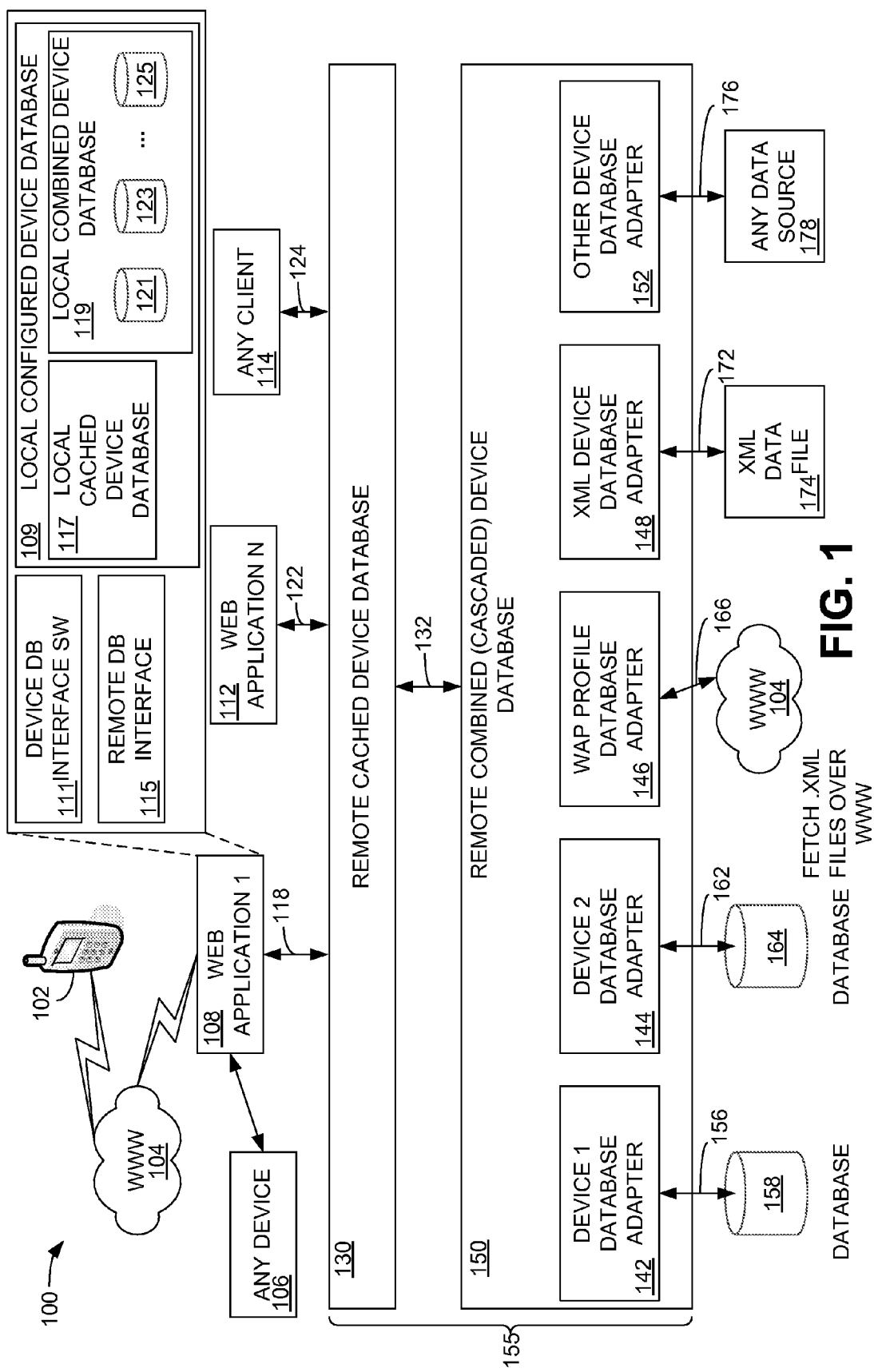
FIG. 1 is a block diagram illustrating an example of a system for device profiling using cascaded databases.

The system and method for device profiling using cascaded databases will be described in the context of delivering application data to a mobile device via the world wide web (WWW), or any other wide area network or local area network. However, the system and method for device profiling using cascaded databases is applicable to delivering any data to any device. Further, the system and method for device profiling using cascaded databases can deliver WAP data to a mobile device, or can deliver other types of data to a mobile device or to any device, such as a personal computer, home appliance, or any other wired or wireless device.

The system and method for device profiling using cascaded databases can be implemented in hardware, software, or a combination of hardware and software. When implemented in hardware, the system and method for device profiling using cascaded databases can be implemented using specialized hardware elements and logic. When the system and method for device profiling using cascaded databases is implemented in software, the software can be used to control the various components in a system and network associated with the program. The software can be stored in a memory and executed by a suitable instruction execution system (microprocessor). The hardware implementation of the system and method for device profiling using cascading databases can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for device profiling using cascaded databases comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1 is a block diagram illustrating an example of a system for device profiling using cascaded databases. The system for device profiling using cascaded databases 100 includes a plurality of applications, also referred to as clients, or client servers, connected to a remote cached device database 130. For example, a first web application 108, a second web application 112, or any other client, referred to using reference 114, are connected to a remote cached device database 130 over connections 118, 122 and 124, respectively. The connections 118, 122 and 124 can be bi-directional connections as known in the art.

As an example, the first web application 108 can be any provider of application data over the world wide web. In the example shown in FIG. 1, the first web application 108 can be a world wide web server that hosts a website and/or that provides wireless application protocol (WAP) data to a mobile device. A mobile device 102 is connected to the first web application 108 via the world wide web 104. However, this need not be the case. As an example, any other device such as a personal computer (PC), a browser, a cable television box, a home appliance, or any other device, as indicated using reference numeral 106, can be coupled to the first web application 108, the second web application 112, or any other client 114, either directly, via the world wide web 104, or via any other wide area network or local area network. Further, the mobile device 102, or any other device 106 can also be referred to as a "client device."

In the example shown in FIG. 1, the mobile device 102 is coupled to the first web application 108 over the world wide web 104. In an exemplary embodiment, the first web application 108 includes a device database interface 111 and a remote database interface 115. The first web application 108 also includes a local configured device database 109. In this example, the local configured device database 109 includes a local cached device database 117 and a local combined (cascaded) device database 119. The local cached device database 117 includes one or more saved databases that include information about any of a plurality of different types of devices that may access or query the first web application 108. The local combined device database 119, also referred to herein as a "cascaded" database, includes elements that allow access to a variety of different databases through which to obtain device profile data for any device that is querying, or accessing, the first web application 108. The local combined device database 119 may include, for example, a number of different databases or services. As a non-limiting example, the local combined device database 119 includes databases 121, 123 and 125. The databases 121, 123 and 125 can be databases or services that include information relevant to the mobile device 102. In an embodiment, the databases 121, 123 and 125 can be arranged and queried in a cascaded configuration, with the order of the cascade chain customized for an individual application, web application, device, client, etc.

In this way, the first web application 108 can determine which device profile data source, or sources, to use and how to prioritize them (e.g., most trusted to least). In an embodiment, the databases can be prioritized based on the first web application 108, based on user preferences, or based on other criteria. In another embodiment, the databases can be pre-prioritized. As an example, the local cached device database 117 may include some device profile data relevant to the mobile device 102. However, as will be described in detail below, there may be information relevant to the efficient serving of a web page, or other data, to the mobile device 102 that is not present in the local cached device database 117. In such an instance, the system and method for device profiling using cascaded databases can obtain the relevant device profile data so that information is accurately and efficiently served to the mobile device 102, or any other device. This will be explained in greater detail below.

The device database interface 111 allows the first web application 108 to access and query the local configured device database 109 or a remote configured device database (to be described below). The remote database interface 115 allows the first web application 108 to access the remote cached device database 130 over connection 118.

The remote cached device database 130, which is accessible by the first web application 108, the second web application 112, and any other client 114, includes one or more saved databases that include information about any of a plurality of different types of devices that may access or query the first web application 108, the second web application 112, or any other client 114. As an example, the remote cached device database 130 may include some device profile data relevant to the mobile device 102. However, as will be described in detail below, there may be information relevant to the efficient serving of a web page, or other data, to the mobile device 102 that is not present in the remote cached device database 130. In such an instance, the system and method for device profiling using cascaded databases can obtain the relevant device profile data so that information is accurately and efficiently served to the mobile device 102, or any other device.

The remote cached device database 130 is connected to a remote combined device database 150 over bi-directional connection 132. The remote combined device database 150, also referred to herein as a "cascaded" database, includes elements that allow access to a variety of different databases through which to obtain device profile data for any device that is querying, or accessing, the first web application 108, the second web application 112, or any other client 114. For example, the remote combined device database 150 includes a first device database adapter 142, a second device database adapter 144, a WAP profile device database adapter 146, an extensible markup language (XML) device database adapter 148 and any other device database adapter, indicated using reference numeral 152.

The first device database adapter 142 communicates with a first database 158 over connection 156. The second device database adapter 144 communicates with a second database 164 over connection 162. The first database 158 might contain certain device profile data, while the second database 164 might contain different device profile data than that contained in the first database 158. For example, the first database 158 may contain device profile data related to a specific device or specific family of devices, while the second database may contain device profile data related to a different device or different family of devices. Alternatively, the first database 158 may contain device profile data relating to the display size of the mobile device 102, while the second database 164 may contain device profile data relating to the video or audio capabilities of the mobile device 102. Further, in an embodiment, the confidence level, also referred to as a trust level, that either first database 158 or second database 164 (or any other data source described herein, including the databases in the local combined database 119) contains accurate device profile data may be different from database to database. When there is more than one source of device profile data available, the database having the device profile data with the highest trust level (i.e., the most trusted) can be used to determine which data to use.

The WAP profile device database adapter 146 is connected to the world wide web 104 via connection 166. In this manner, the WAP profile device database adapter 146 can obtain XML files having XML-related device profile data, over the world wide web 104.

The XML device database adapter 148 is connected to an XML data file 174 over connection 172. The XML device database adapter 148 obtains information from the XML data file, relevant to XML-related device profile data pertinent to the mobile device 102. Further, any other device database adapter, indicated using reference numeral 152, can be included in the remote combined device database 150, and coupled to any data source 178. Any data source 178 refers to any possible source of device profile data to which the other device database adapter 152 can be coupled. For example, the data source 178 can be a file, a web service, a relational database or any type of device profile data source containing data that is relevant to the device 102 and relevant to the type of data that the first web application 108 is attempting to deliver to the device 102. Non-limiting examples of data that may be relevant to the type of data that the first web application 108 is attempting to deliver to the device 102 include video data, audio data, markup data, data about the physical characteristics of the device 102, and other data.

In an embodiment, the remote cached device database 130 and the remote combined device database 150 form what is referred to as a remote configured database 155, which is presented to the client, in this example, the first web application 108. The remote configured database 155 can also be referred to as a remote central device database. However, in an embodiment, the remote configured database 155 may include only the remote combined device database 150. When any client queries for device profile data, it queries the "device database" for the data. In this case the "device database" can be the local configured device database 109 or the remote configured device database 155. In all cases the client communicates with a "device database," whether it is a local cached device database 117, a remote cached device database 130, a local combined database 119, a remote combined database 150, an xml file, or any other database.

In an embodiment, multiple device profile data sources are represented as independent standardized databases 158, 164 and 174, each database having a standard interface. While not a standard database, the WAP profile database adapter 146 can access the world wide web 104 to obtain XML files, and appear as a database to the first web application 108. The standard interface can be implemented as an adapter to each specific device profile data source, as described above.

The independent standardized databases 158, 164 and 174 can be arranged in a cascaded configuration, with the order of the cascade chain customized for an individual application, web application, device, client, etc. In this way, the first web application 108 can determine which device profile data source, or sources, to use and how to prioritize them (e.g., most trusted to least).

The cascaded set of databases appears to the first web application 108 as a single database, i.e., the local combined database 119 and the remote combined device database 150. However, when the first web application 108 makes a request for device profile data, the request is directed to the databases in the cascade chain in the order of priority until one of the databases responds with the appropriate data. In an embodiment, the local configured device database 109 will be queried before the remote combined device database 150. The data from the database is then returned to the first web application 108.

As a non-limiting example using the remote combined device database 150, assume that a chain of databases is configured from the following device databases. The first database 158 is a video data database having video information. The second database 164 is a markup database having markup information. A third database (not shown) is an open source (OS) markup database having markup information, but it is an open source database, and is not trusted as much as the second database 164 is trusted. A fourth database (not shown) is an open source video database having video information, but it is an open source database, and is not trusted as much as the first database 158 is trusted.

The databases can be prioritized as follows: 1) video data database, 2) markup database, 3) open source markup database, 4) open source video database. However, the order of prioritization need not match the order in which the databases are described. Further, other sources of device profile data, such as the WAP profile database adapter 146 accessing the world wide web 104 to obtain XML files, can be prioritized as described above.

In an embodiment, the remote configured device database 155 can also be made available as a central web service. When implemented in this manner, the remote configured device database 155 can be accessed by web servers to use the database as described above. For example, the web application 112 can access the remote configured device database 155 as an XML based web service. This allows the device profile data to be centralized and easily distributed.

In a non-limiting example, the local combined device database 119 can be similar to the remote combined device database 150. The local combined device database 119 and the remote combined device database 150 each have multiple databases in a prioritized order. In an example, the local combined device database 119 contains updates that may be specific to the first web application 108. The local combined device database 119 then may point at the remote cached device database 130, which contains default data that corresponds to the particular web application. In this way, for example, one client may use different data than another client, but both clients can benefit from the remote combined device database 150.

For example, a first client may wish to access a site that has no table support. This means that the first database (i.e., database 121) in the local configured device database 109 for the first client has a database that matches on all mobile devices, and when queried whether it supports tables, always replies no. So, this first database overrides the true value that might be found in the remote combined device database 150. This example illustrates why the first database 121 should be located in the local combined device database 119.

The next example illustrates how an embodiment of the system responds when the remote configured database 155 does not have the desired device profile data. Each application can control the "default profile" by using a local combined device database 119 that has the last database with a default profile loaded. When a database has no data for the query, the system keeps querying subsequent databases. Therefore, if no database contains the desired device profile data, then the system eventually makes it to the last database. In the local configured device database 109 this last database is the default database, for example database 125. In this example, the default database 125 has an answer for all queries, but instead of it being the correct answer, it is a best guess. Because different clients may have different requirements for the data in the device profile, they may each have a different local configured device database.

Figure 2A:
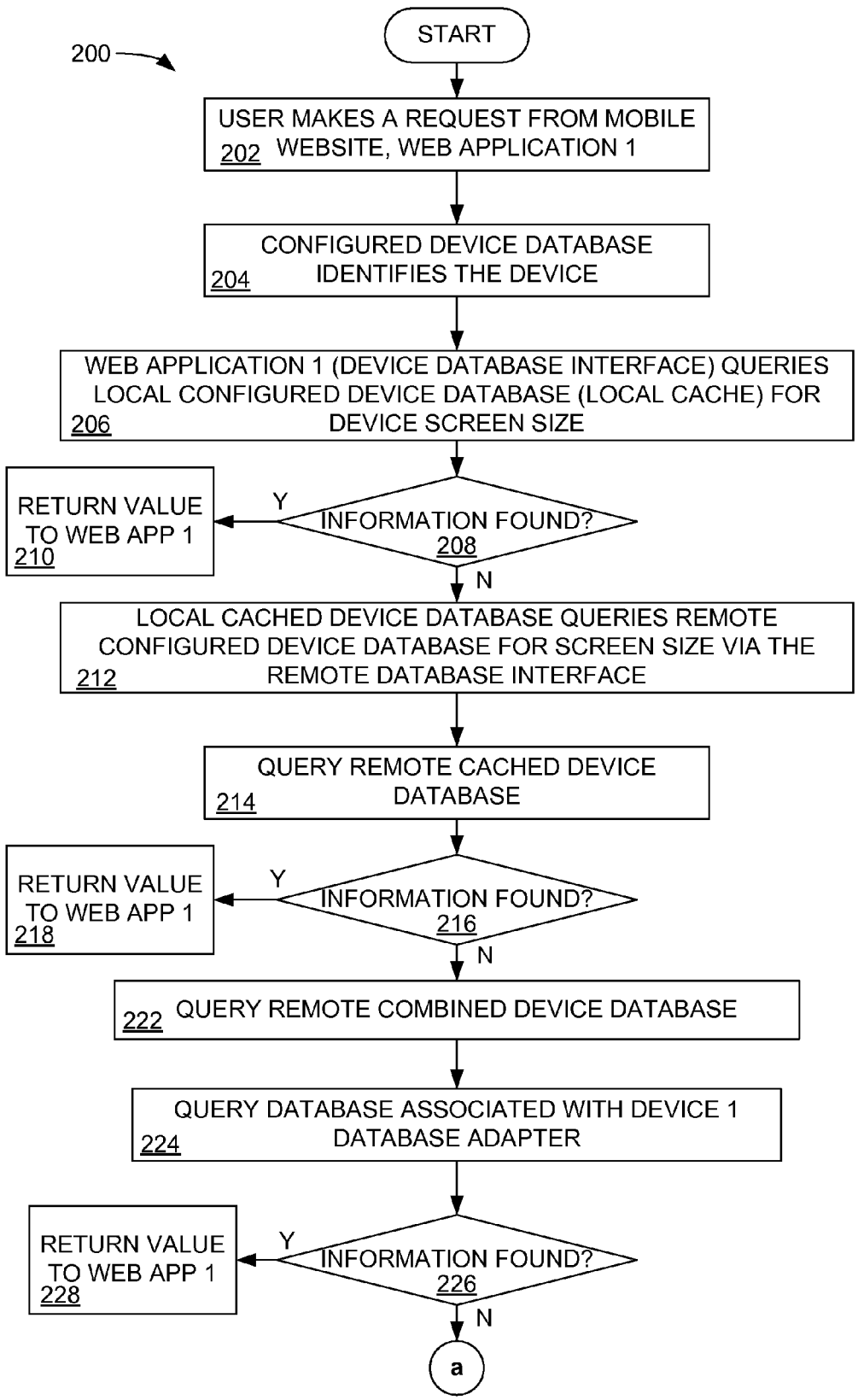
FIGS. 2A and 2B are a flowchart collectively illustrating the operation of an embodiment of a method for device profiling using cascaded databases.
Figure 2B:
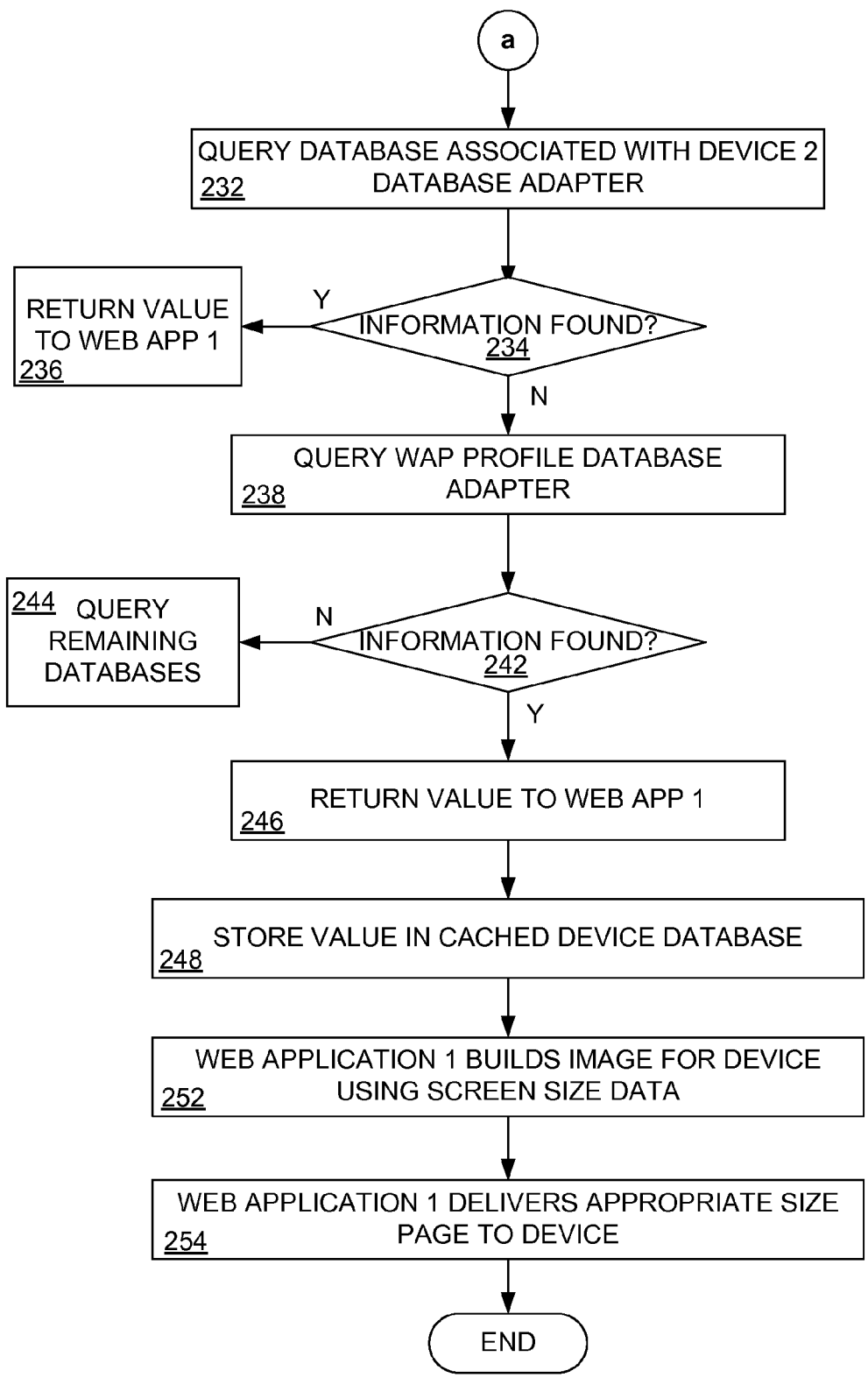

FIGS. 2A and 2B are a flowchart collectively illustrating the operation of an embodiment of a method for device profiling using cascading databases. The blocks in the flowchart 200 can be performed in or out of the order shown, or can be performed substantially in parallel. In block 202, a user of the mobile device 102 makes a request of the first web application 108. For purposes of example only, the mobile device 102 requests a mobile website containing an image that will be displayed on the mobile device 102.

In block 204, the configured device database identifies the type and/or model of the mobile device 102. In an embodiment, the local configured device database 109 is used initially to identify the type of mobile device 102.

In block 206, the device database interface 111 in the first web application 108 queries the local configured device database 109 to obtain information about the mobile device 102. The local configured device database 109 may include a local cached device database 117 and a local combined device database 119. In this example, it is assumed that the local configured device database 109 does not contain the desired device profile data.

In block 208, it is determined whether the local configured device database 109 contains the desired device profile data. If the local configured device database 109 contains the desired device profile data, the data is provided to the first web application 108 in block 210 and the process ends. When the desired device profile data is returned to the first web application 108, the data can be stored in the local cached device database 117 and/or in the remote cached device database 130, as will be described below. In this example, it is assumed that the desired device profile data has not yet been obtained and the process continues. If the local configured device database 109 does not contain the desired device profile data, the process proceeds to block 212.

In block 212, the local cached device database 117, via the remote database interface 115, queries the remote configured device database 155 for the device screen size. In block 214, the remote cached device database 130 is queried for the desired information. In an embodiment, the remote cached device database 130 is optional. When the remote cached device database 130 is implemented, the remote cached device database 130 is queried for the desired device profile data first.

In block 216, it is determined whether the remote cached device database 130 contains the desired device data. If the remote cached device database 130 contains the desired device data, the data is provided to the first web application 108 in block 218 and the process ends. If the remote cached device database 130 does not contain the desired device data, the process proceeds to block 222.

In block 222, the remote cached device database 130 queries the remote combined device database 150 for the desired device profile data. For example, in blocks 214 and 222, the remote database interface 115 queries the remote configured device database 155. First, the remote cached device database 130 is queried to check for device profile data relating to the screen size for the mobile device 102. In this example, it is assumed that the screen size information relating to the mobile device 102 is not contained in the remote cached device database 130.

In block 222, the remote cached device database 130 begins querying the remote combined device database 150. In an embodiment, this type of cache is a called a "pull-through cache." In such an implementation, the remote cached device database 130 queries and retrieves data from a source when it does not have the data.

As an example, each of the databases associated with the remote combined device database 150 may have a "trust level." The trust level is an indicator of the anticipated accuracy of the device profile data contained within each database, and can be used to prioritize the order in which the various databases are queried for the device information.

If the desired data is not found in the local configured device database 109, the first web application 108 will query the remote configured device database 155. The remote cached device database 130 will be queried first for the desired device profile data. If the desired device profile data is not found in the remote cached device database 130, the remote cached device database 130 will query the remote combined device database 150. The remote combined device database 150 will query the most trusted database first, and will then progress in a predefined order to less trusted databases, until one of the databases 158, 164, 174, or 178, is found to contain the data. The databases are queried in the order that they are provided, or any order defined by a user of the system. In an embodiment, the order can be determined by a system administrator. In an embodiment, the first database that has the requested data is used. In this manner, the most trusted databases are placed first and queried first. For example, if the remote combined device database 150 contains four (4) databases, and the first database 158 does not have the data, the second database 164 is queried. If the second database has the data, then that data would be used. At this point the data has been found, so the remaining databases are not queried for the data.

In block 224, the remote configured device database 155 is queried for the desired device profile data. Because the remote cached device database 130 does not have the desired data, the remote combined device database 150 queries the first device database adapter 142 to query the first database 158 for the device screen size data. In block 226 it is determined whether the first database 158 contains the desired data. If, it is determined in block 226, that the first database 158 contains the desired screen size data for the mobile device 102, then the process proceeds to block 228 where the device profile data relating to the device screen size is returned to the first web application 108.

If, however, in block 226 it is determined that the first database 158 does not contain the desired data, then, in block 232, the remote combined device database 150 queries the second device database adapter 144 to query the second database 164 for the mobile device screen size data. In block 234, it is determined whether the second database 164 contains the desired screen size data for the mobile device 102. If, it is determined in block 234 that the second database 164 contains the desired screen size data for the mobile device 102, then, the process proceeds to block 236 where the device profile data relating to the device screen size is returned to the first web application 108.

If, however, in block 234 it is determined that the second database 164 does not contain the desired data, then, in block 238, the remote combined device database 150 queries the WAP profile device database adapter 146 to query the availability of XML files over the world wide web 104. In block 242 is determined whether the WAP profile device database adapter 146 obtained the desired information. If the WAP profile device database adapter 146 has not obtained the desired information, then, in block 244, the remaining databases 174 and 178 are queried in the order determined as described above.

If, it is determined in block 242 that the desired information is found, then, in block 246, the device screen size data is returned to the first web application 108.

In block 248 the value to relating to the desired screen size data for the mobile device 102 can optionally be stored in the remote cached device database 130. Storing the data in the remote cached device database 130 may reduce the time for future requests that may use the same data. Alternatively, the value to relating to the desired screen size data for the mobile device 102 can optionally be stored in the local cached device database 117.

In block 252, the first web application 108 builds the image for the mobile device 102, using the device profile data relating to the screen size of the mobile device 102.

In block 254, the mobile device 102 receives an image from the first web application 108 that is appropriately sized for the display on the mobile device 102.

Figure 3:
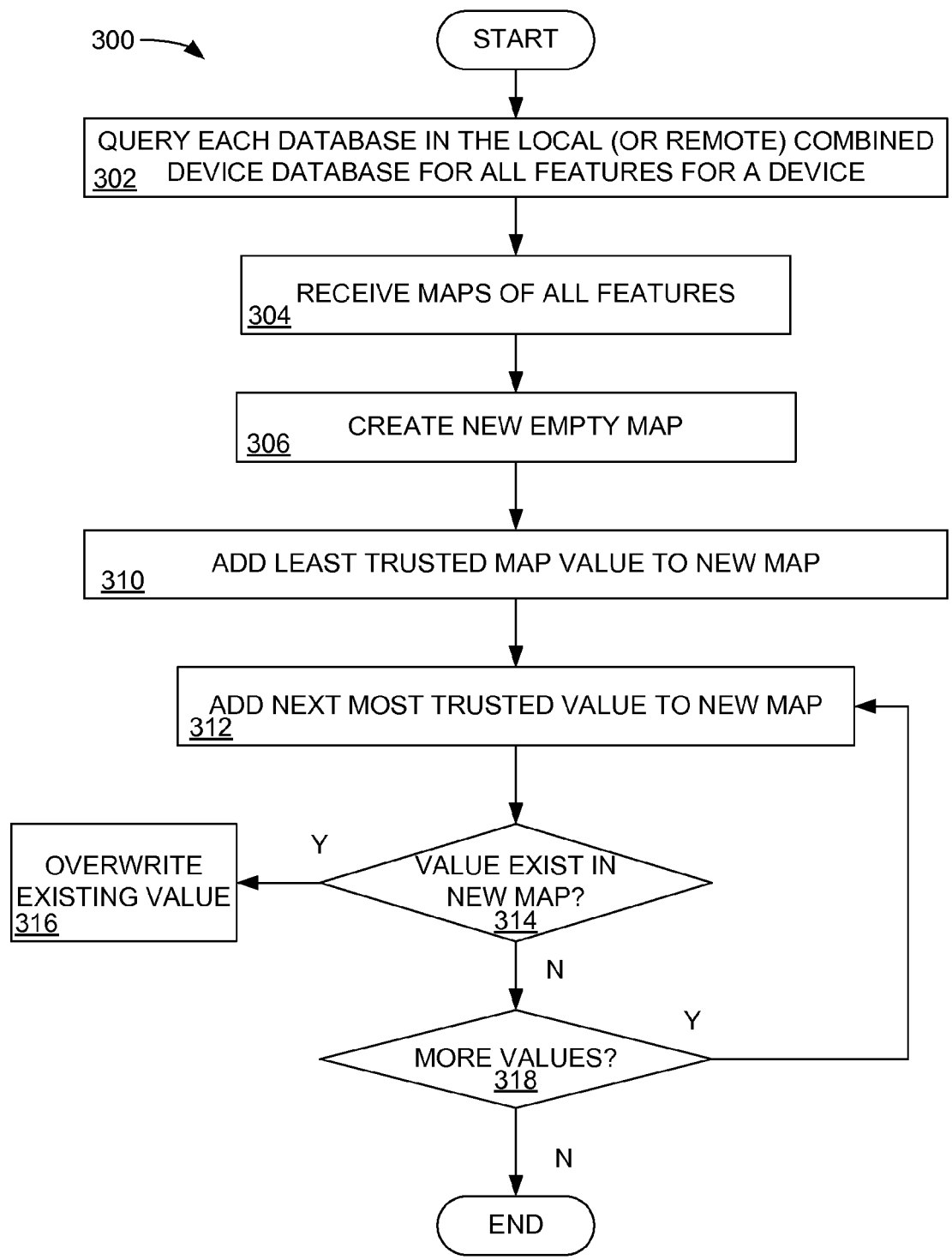
FIG. 3 is a flowchart illustrating an alternative embodiment of a method for device profiling using cascaded databases.
Figure 4:
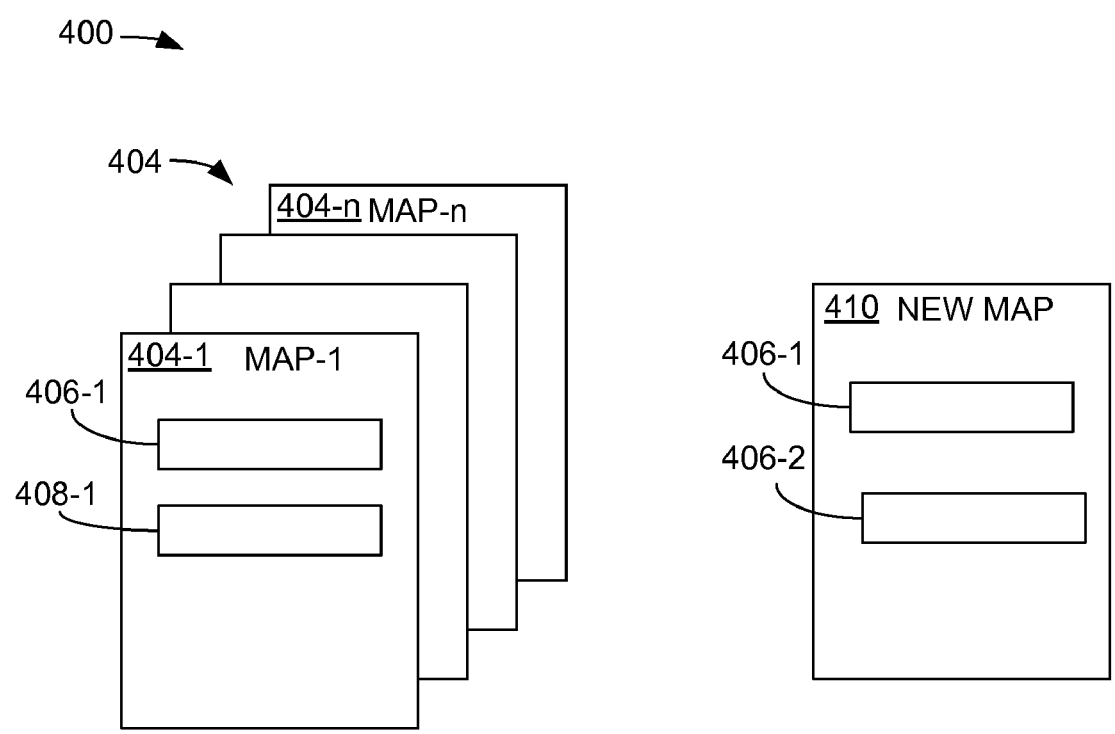
FIG. 4 is a block diagram illustrating the alternative embodiment of FIG. 3.

FIG. 3 is a flowchart illustrating an alternative embodiment of a method for device profiling using cascaded databases. FIG. 4 is a block diagram illustrating the alternative embodiment of FIG. 3. Recognizing that most of the clients that will query the databases described above will query for multiple device features, an optimization to the querying process that will minimize the database lookup time is to request all information available for a particular device at one time. This eliminates multiple queries.

With reference to FIG. 3 and to FIG. 4, in block 302, each database in the local (or remote) combined database is queried for all features of a mobile device 102. The maps are received in block 304. This query results in a list of maps 404, referred to as maps 404-1 through 404-n. Each map 404 contains feature name keys 406, and value objects 408, referred to using the nomenclature 406-1 through 406-n for the feature name keys and 408-1 through 408-n for the value objects. Some of these maps may contain part of the desired device profile data, and some may contain all of the desired device profile data. In an embodiment, the maps 404 can be combined in a way that honors the assigned trust level described above.

In an embodiment, in block 306, a new empty map 410 is created. As the maps are combined, the least trusted map values are added first, and the most trusted are added last. Beginning in block 310, the values from the maps 404 are added to the new map 410 in the reverse order of trust. In block 310, features from the least trusted map (for example, map 404-1) is added to the new map first. This is illustrated as feature 406-1 in new map 410.

In block 312, the next most trusted value is added to the new map 410. In this example, the value 406-2 is added to the new map 410. In block 314 it is determined if the value added in block 312 is already present in the new map 410. If a value is added that already exists in the new map 410 it is overwritten by the new value in block 316. In this manner, the most trusted features are added last so that they overwrite the least trusted values. In block 318 it is determined whether more values are to be added to the new map 410. If there are additional values to be added to the new map 410, the process returns to block 312. If there are no additional values to be added to the new map 410, the process ends.

This feature allows clients to query for all of the features at once, rather than making multiple queries. Another way to use this "all-at-once" feature is for caching. The local and remote cached device databases may have clients that do not now about the all-at-once feature. The cached databases can store the results of the all-at-once map and use this map to answer single feature requests.

While various embodiments of the invention have been described, it will be apparent to those of ordinary skill in the art that many more embodiments and implementations are possible that are within the scope of the invention.

What is claimed is:

1. A system for device profiling using cascaded databases, comprising:
    a client configured to deliver data to a device; and
    a plurality of databases accessible by the client, each of the plurality of databases containing information relevant to the device such that the plurality of databases are queried in a prioritized order to obtain information relevant to the device, wherein the prioritized order is dependent upon a trust level associated with each of the plurality of databases.

2. The system of claim 1, further comprising a combined device database containing the plurality of databases in a cascaded arrangement.

3. The system of claim 1, in which at least one of the plurality of databases comprises extensible markup language (XML) information that is accessed over the world wide web.

4. The system of claim 1, in which a device profile is created from the information relevant to the device obtained in the query, where the inclusion of information relevant to the device in the device profile is dependent upon the trust level associated with each of the plurality of databases from which the information was obtained.

5. The system of claim 2, in which the combined device database further comprises an adapter associated with each of the plurality of databases.

6. The system of claim 4, further comprising a cached device database associated with the client and with the combined device database, the cached device database configured to store the device profile.

7. The system of claim 1, in which the device is a mobile device and the client is a world wide web server configured to deliver wireless application protocol (WAP) data to the mobile device.

8. The system of claim 6, in which the combined device database and the cached database are remotely located from the client.

9. A method for device profiling using cascaded databases, comprising:
- coupling a device to a client, the client configured to deliver data to the device;
- coupling a plurality of databases to the client, each of the plurality of databases containing information relevant to the device; and
- querying the plurality of databases by the client in a prioritized order to obtain information relevant to the device wherein the prioritized order is dependent upon a trust level associated with each of the plurality of databases.

10. The method of claim 9, further comprising associating the plurality of databases in a cascaded arrangement into a combined device database.

11. The method of claim 9, in which at least one of the plurality of databases comprises extensible markup language (XML) information that the client accesses over the world wide web.

12. The method of claim 9, further comprising creating a device profile from the information relevant to the device obtained in the query, where the inclusion of the information relevant to the device profile is dependent upon a trust level associated with each of the plurality of databases from which the information was obtained.

13. The method of claim 10, further comprising associating an adapter with each of the plurality of databases.

14. The method of claim 12, further comprising:
- associating a cached device database with the client and with the combined device database; and
- storing in the cached device database the device profile.

15. The method of claim 9, in which the device is a mobile device and the client is a world wide web server configured to deliver wireless application protocol (WAP) data to the mobile device.

16. The method of claim 14, in which the combined device database and the cached device database are remotely located from the client.

17. A method for device profiling using cascaded databases, comprising:
- coupling a device to a client, the client configured to deliver data to the device;
- determining a type of data to deliver to the device;
- coupling a plurality of databases to the client, each of the plurality of databases containing information relevant to the device; and
- querying the plurality of databases by the client in a prioritized order to obtain information relevant to the type of data to be delivered to the device, wherein the prioritized order is dependent upon a trust level associated with each of the plurality of databases.

18. The method of claim 17, further comprising associating the plurality of databases in a cascaded arrangement into a combined device database.

19. The method of claim 17, in which at least one of the plurality of databases comprises information relevant to video data, audio data, markup data and data about the physical characteristics of the device.

20. The method of claim 17, further comprising creating a device profile from the information relevant to the device obtained in the query, where the inclusion of information relevant to the device in the device profile is dependent upon a trust level associated with each of the plurality of databases from which the information was obtained.

21. The method of claim 18, further comprising associating an adapter with each of the plurality of databases.

22. The method of claim 20, further comprising:
- associating a cached device database with the client and with the combined device database; and
- storing in the cached device database the device profile.

23. The method of claim 17, in which the device is a mobile device and the client is a world wide web server configured to deliver wireless application protocol (WAP) data to the mobile device.

24. The method of claim 22, in which the combined device database and the cached device database are remotely located from the client.

25. The method of claim 22, in which the cached device database and the combined device database form a configured device database that is remotely accessible to a world wide web server.

26. The method of claim 25, in which the configured device database is accessible to a world wide web server using extensible markup language (XML).

27. The method of claim 17, in which each of the plurality of databases are queried for all of the data relevant to a device.

* * * * *